United States Patent
Stacey et al.

(10) Patent No.: US 9,976,850 B2
(45) Date of Patent: May 22, 2018

(54) OPTICAL SURFACE ROUGHNESS MEASUREMENT

(71) Applicant: BAE SYSTEMS plc, London (GB)

(72) Inventors: Craig Daniel Stacey, Bristol (GB); Jeffrey Paul Sargent, Bristol (GB)

(73) Assignee: BAE SYSTEMS plc, London (GB)

( * ) Notice: Subject to any disclaimer, the term of this patent is extended or adjusted under 35 U.S.C. 154(b) by 0 days. days.

(21) Appl. No.: 14/917,863

(22) PCT Filed: Sep. 4, 2014

(86) PCT No.: PCT/GB2014/052661
§ 371 (c)(1),
(2) Date: Mar. 9, 2016

(87) PCT Pub. No.: WO2015/036732
PCT Pub. Date: Mar. 19, 2015

(65) Prior Publication Data
US 2016/0223323 A1    Aug. 4, 2016

(30) Foreign Application Priority Data

Sep. 10, 2013 (EP) .................................... 13275206
Sep. 10, 2013 (GB) ................................. 1316099.9

(51) Int. Cl.
     *G01B 11/30*      (2006.01)
(52) U.S. Cl.
     CPC .................................. *G01B 11/303* (2013.01)
(58) Field of Classification Search
     CPC .................................................... G01B 11/303
(Continued)

(56) References Cited

U.S. PATENT DOCUMENTS 4,889,998 A    12/1989   Hayano et al.
5,311,286 A *   5/1994   Pike ..................... G01B 11/254
                                                     250/237 G
(Continued)

FOREIGN PATENT DOCUMENTS

DE      102011118607 A1    3/2013
EP        0066030 A1    12/1982
(Continued)

OTHER PUBLICATIONS

International Preliminary Report on Patentability received for Patent Application No. PCT/GB2014/052661, dated Mar. 24, 2016. 8 pages.

(Continued)

*Primary Examiner* — Tri T Ton
(74) *Attorney, Agent, or Firm* — Finch & Maloney PLLC (57) ABSTRACT

An optical surface roughness measurement-enabling arrangement and method are disclosed for enabling measurement of the surface roughness of a material. The arrangement comprises an optical radiation source for generating a beam of collimated radiation along a first axis for illuminating the surface of the material with the radiation directed along the first axis, a refractive optical element optically alignable with the beam of radiation for refracting the beam along a second axis which is non-parallel with the first axis, for illuminating the surface of the material with the radiation directed along the second axis and a detector which is arranged to detect the radiation, incident upon the surface along the first axis and second axis, which becomes reflected off the surface of the material. An optical surface roughness measuring arrangement and method are also disclosed for providing a measurement value of the surface roughness.

14 Claims, 5 Drawing Sheets

(58) Field of Classification Search
USPC ..... 356/600–601, 237.1–237.6, 239.1–239.8
See application file for complete search history.

(56) References Cited

U.S. PATENT DOCUMENTS

| | | | |
|---|---|---|---|
| 6,226,092 B1 | 5/2001 | de Lega | |
| 7,221,788 B2 * | 5/2007 | Schulze | G06T 7/001 356/237.5 |
| 2003/0169467 A1 * | 9/2003 | Miyagawa | G02B 26/0883 358/509 |
| 2005/0206905 A1 * | 9/2005 | Iwamoto | G01B 11/026 356/494 |
| 2006/0126074 A1 | 6/2006 | Van Der Werf et al. | |
| 2008/0123106 A1 | 5/2008 | Zeng et al. | |
| 2011/0122414 A1 | 5/2011 | Fleischer et al. | |

FOREIGN PATENT DOCUMENTS

| | | |
|---|---|---|
| JP | 55072806 A | 6/1980 |
| JP | 57200808 A | 12/1982 |
| JP | S6010105 A | 1/1985 |
| JP | H02171609 A | 7/1990 |
| JP | H08292007 A | 11/1996 |
| JP | H0949757 A | 2/1997 |
| JP | 2001099629 A | 4/2001 |
| JP | 2005335079 A | 12/2005 |
| WO | 2008140758 A1 | 11/2008 |
| WO | 2015036732 A1 | 3/2015 |

OTHER PUBLICATIONS

International Search Report and Written Opinion received for Patent Application No. PCT/GB2014/052661, dated Oct. 7, 2014. 10 pages.
GB Intellectual Property Office Search Report under Section 17(5) received for GB Patent Application No. 1316099.9 dated Dec. 31, 2013. 4 pages.
Extended European Search Report received for EP Patent Application No. 13275206.4 dated Nov. 11, 2013. 7 pages.
Loriette, Vincent, "Point defect 3D mapping in thick transparent substrates," Journal of Optics. A, Pure and Applied Optics, Institute of Physics Publishing, Bristol, GB, vol. 2, No. 2, Mar. 1, 2000. pp. 70-76.
English translation of JP Office Action received for related JP Application No. 2016-542358. Drafting Date: Feb. 9, 2017. 3 pages.

* cited by examiner

Fig. 1

(Prior Art)

OPTICAL SURFACE ROUGHNESS MEASUREMENT

FIELD OF DISCLOSURE

The present invention relates to optical surface roughness measurement and to an optical surface roughness measurement-enabling arrangement and method for enabling measurement of the surface roughness of a material. The invention further relates to an optical surface roughness measuring arrangement and method of measuring the surface roughness of a material.

BACKGROUND

It is often necessary to measure the average surface roughness of a material. There are various definitions of surface roughness and a corresponding number of quantitative parameters. Essentially however, the measurement indicates height variations on the surface of the material under inspection and the average of these height variations is indicated by the parameter Ra.

There are a number of methods used for measuring surface roughness of a material. Some involve the use of a stylus that is drawn over the surface of the material with the vertical deflection of the stylus providing a measure of the surface roughness. However with this method, the resolution of the measurement is limited to the dimensions of the stylus and the contact pressure of the stylus on the surface of the material can damage the surface. Other methods involve illuminating the surface with radiation and then analysing the contrast in the resulting speckle that is generated. However, each of these methods only provides a limited measurement range and has a limited resolution.

An alternative method comprises illuminating the surface of a material using a collimated beam of radiation from two slightly different incident angles. The radiation incident upon the surface at the two different incident angles is then correlated to determine the surface roughness and this correlation method is found to provide an extended measurement range compared to the alternatives.

Figure 1:
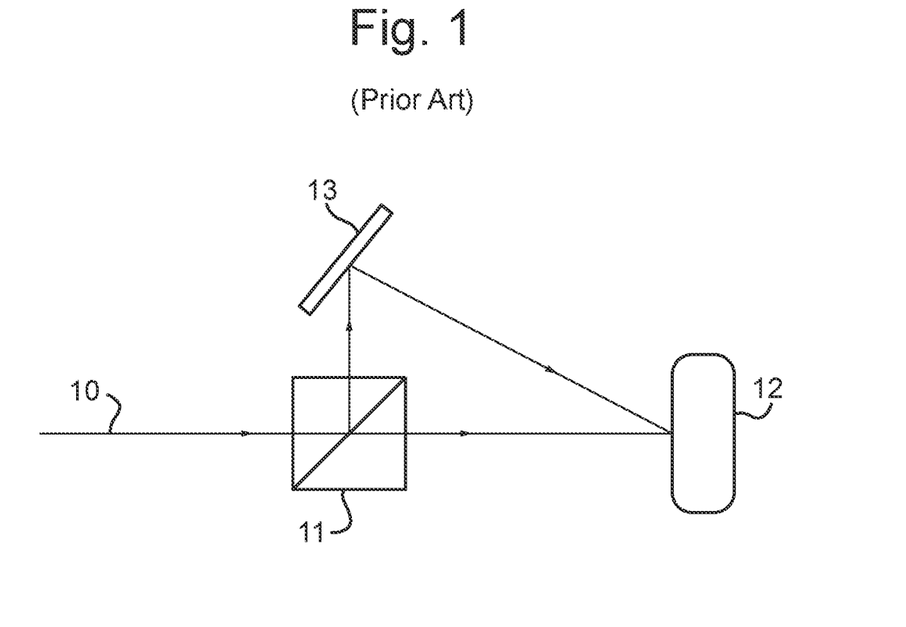
FIG. 1 is a schematic illustration of a known arrangement for enabling the measurement of the surface roughness of a material.

In order to illuminate the material surface at slightly differing incident angles, either the material is rotated or the beam of radiation is deflected. The former is not always practical for measurement of large pieces arranged in-situ. For the latter, and referring to FIG. 1 of the drawings, the principal approach is to reflect a portion of the beam 10 using a beam-cube beam splitter 11, and to re-direct the reflected beam onto the test piece 12 using a mirror 13. Experimental investigations have shown that the closest agreement between the measured values of surface roughness using the various techniques occurs when the difference in incident angles is of the order of ~1°. However, the physical size of the beam splitter 11 and mirror 13 presents a lower limit on the difference in the incident angles (arising from the lower limit on the physical path length of the reflected beam from the original) of the beams used to illuminate the surface, particularly in a limited space, and thus presents a lower limit to the error which can be achieved when making the measurement of surface roughness.

SUMMARY

In accordance with the present invention, as seen from a first aspect, there is provided an optical surface roughness measurement-enabling arrangement for enabling measurement of the surface roughness of a material, the arrangement comprising:
  an optical radiation source for generating a beam of collimated radiation and directing the beam along a first axis for illuminating the surface of the material;
  a refractive optical element optically alignable with the beam of radiation for refracting the beam and directing the refracted beam along a second axis which is non-parallel with the first axis, for illuminating the surface of the material;
  a detector which is arranged to detect the radiation, incident upon the surface along the first axis and second axis, which becomes reflected off the surface of the material.

Advantageously, the refractive optical element removes the lower angular limit between the incident beams of radiation, thereby enabling a measurement of surface roughness comprising a reduced error.

The refractive optical element is formed of a material, such as silica, which is substantially transmissive for the wavelength of the radiation from the radiation source, with the principal losses arising from the Fresnel reflections at the air-element interfaces. In an embodiment, the refractive optical element comprises a front and rear substantially planar optical surface through which the beam of radiation is arranged to pass, the front and rear surface being orientated at an acute angle to each other. The refractive optical element may comprise an optical wedge or more preferably an optical prism.

The optical radiation source preferably comprises a source of laser radiation, such as a diode-pumped frequency-doubled Nd:YAG laser, emitting a wavelength of 532 nm. The laser source is required to provide a coherence length of the order of millimeters, such that a useful spackle pattern of radiation is produced at the detector. The wavelength should be chosen to be consistent with the transmission window of the optical element in the arrangement and also consistent with the spectral response of the detector.

The first and second axes are preferably orientated at an angle less than 5°, more preferably less than 2° and further preferably substantially 1°.

In accordance with a second aspect of the present invention, there is provided an optical surface roughness measuring arrangement for measuring the surface roughness of a material, the arrangement comprising:
  the optical surface roughness measurement-enabling arrangement of the first aspect; and,
  a processor for processing the detected radiation to provide a measurement of the surface roughness.

Preferred features of the measuring arrangement of the second aspect may comprise one or more of the preferred features of the measurement-enabling arrangement of the first aspect.

In accordance with a third aspect of the present invention, there is provide a method of enabling a measurement of the surface roughness of a material, the method comprising the steps of:
  illuminating the surface of the material with a beam of radiation directed along a first axis;
  refracting the beam of radiation directed along the first axis, using a refractive optical element, along a second axis which is non-parallel with the first axis, so that the surface of the material becomes illuminated with a beam of radiation directed along the second axis; and, detecting the radiation, incident upon the surface along the first axis and second axis, which becomes reflected off the surface of the material.

In accordance with a fourth aspect of the present invention, there is provided a method of measuring the surface roughness of a material, the method comprising the steps of the method enabling the measurement of the surface roughness of a material according to the third aspect and subsequently processing the detected radiation to provide a measurement of the surface roughness.

In an embodiment, the processing of the detected radiation comprises correlating the radiation reflected from the surface from the first axis with the radiation reflected from the surface from the second axis. This may include generating a correlation value or coefficient, between the two sets of detected radiation, using a convolution algorithm.

The surface roughness Rq may be determined according to the relationship:

$$C = \exp(-(R_q k \delta \alpha \sin \alpha)^2)$$

where C is the correlation coefficient and α is the absolute angle of incidence to the material surface.

According to a further aspect of the invention, there is provided a method of measuring the surface roughness of sheet material including the steps of positioning an arrangement according to the second aspect adjacent a conveyor conveying the sheet material past the arrangement and operating the arrangement whereby to measure the said surface roughness.

BRIEF DESCRIPTION OF THE DRAWINGS

Embodiments of the present invention will now be described by way of example only and with reference to the accompanying drawings, in which.

DETAILED DESCRIPTION

Figure 2A:
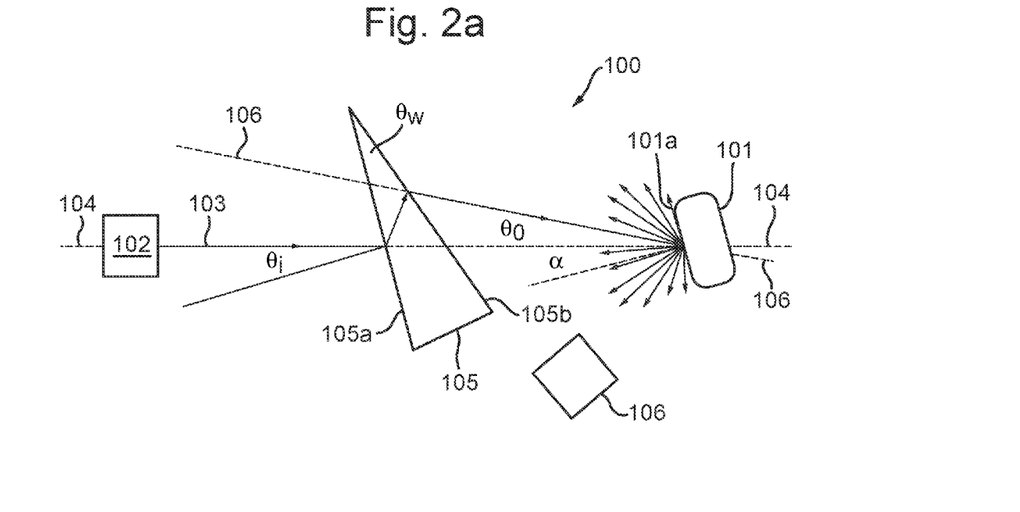
FIG. 2a is a schematic illustration of an optical surface roughness measurement-enabling arrangement for enabling measurement of the surface roughness of a material according to an embodiment of the present invention, with the refractive optical element optically aligned with the radiation source.

Referring to FIG. 2a of the drawings, there is illustrated an optical surface roughness measurement-enabling arrangement 100 for enabling measurement of the surface roughness of a material 101 according to an embodiment of the present invention. The arrangement 100 comprises a source of radiation 102, such as a laser source, which is arranged to generate a collimated beam of radiation 103 along a first axis 104, for illuminating the surface of the material with radiation directed along the first axis 104. Typically, the first axis will comprise a non-zero angle (α) of incidence with the surface of the material. The arrangement 100 further comprises a refractive optical element 105 optically alignable with the radiation source 102 along the first axis 104, for refracting the radiation incident thereon, along a second axis 106.

The refractive optical element 105 is arranged to selectively refract the beam 103 incident thereon such that the beam 103 refracted (shown exaggerated in FIG. 2a) exits the element 105 and propagates along a second axis 106 which is non-parallel with the first axis 104, but which converges toward the first axis 104 in a direction which is away from the element 105 toward the material 101. In order to achieve this, the front and rear surfaces 105a, 105b of the element 105 are each substantially planar and are orientated at an acute angle with respect to each other, such that the element 105 comprises an optical prism or wedge. The radiation exiting the element 105 along the second axis 106 is also used to illuminate the surface 101a of the material 101 and at least a portion of the radiation reflected from the surface 101a is captured by a detector 107 for enabling a subsequent measurement of the surface roughness of the material 101.

The angular orientation of the second axis 106 relative to the first axis 103, namely $\theta_0$, is determined according to the relationship:

$$\theta_0 = \arcsin\left[\sin\theta_i \cos\theta_w - n\left(1 - \left(\frac{\sin^2\theta_i}{n^2}\right)\right)^{0.8} \sin\theta_w\right] + \theta_w - \theta_i$$

where $\theta_i$ is the angle at which the beam 103 is incident upon the front surface 105a of the optical element 105, $\theta_w$ is the angle between the front and rear surface 105a, 105b of the element 105, and n is the refractive index of the element 105. Using this relationship, a particular angular orientation may be determined by incorporating the appropriate prism and illuminating the prism at the appropriate angle of incidence. The angular orientation is typically chosen to be less than 5°, and in an embodiment, this orientation is preferably less than 2° and more preferably substantially of the order of 1°. It is thus evident that the arrangement 100 provides for at least an improved lower limit to the angular orientation compared with existing optical arrangements, and is independent of the physical size of components of the arrangement 100

Figure 2B:
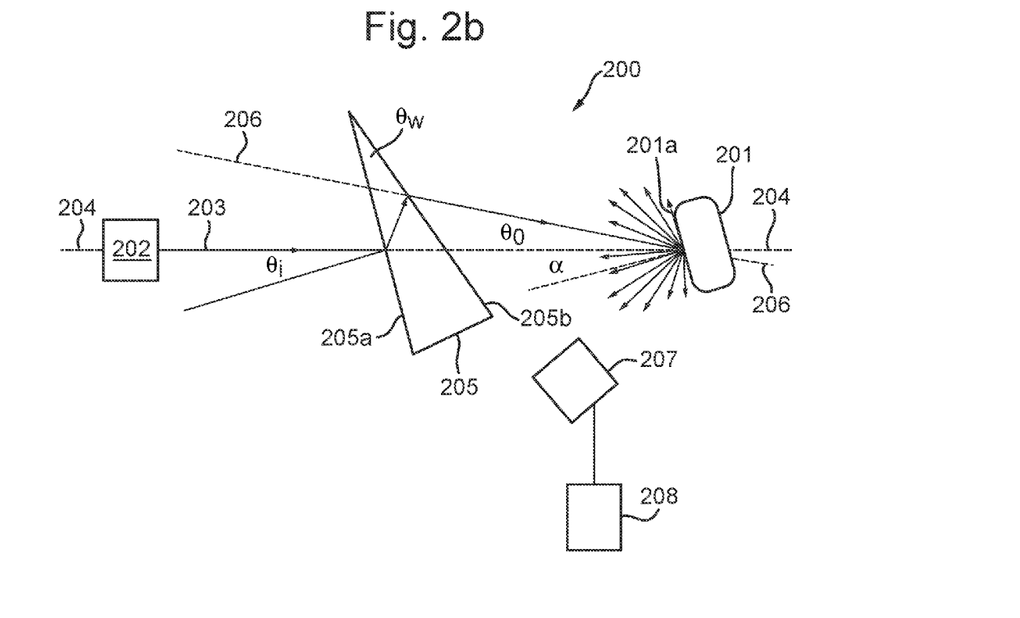
FIG. 2b is a schematic illustration of an optical surface roughness measuring arrangement for measuring the surface roughness of a material with the refractive optical element optically aligned with the radiation source, according to an embodiment of the present invention.

Referring to FIG. 2b of the drawings, there is illustrated an optical surface roughness measuring arrangement 200 for providing a measurement of the surface roughness of a material 201. The measuring arrangement 200 comprises the measurement-enabling arrangement 100 described above and as such, similar features have been referenced using the same numerals, but increased by 100.

The measuring arrangement 200 further comprises a processor 208 communicatively coupled with the detector 207, which is arranged to process the radiation captured by the detector 207 to generate a value for the surface roughness.

Figure 3A:
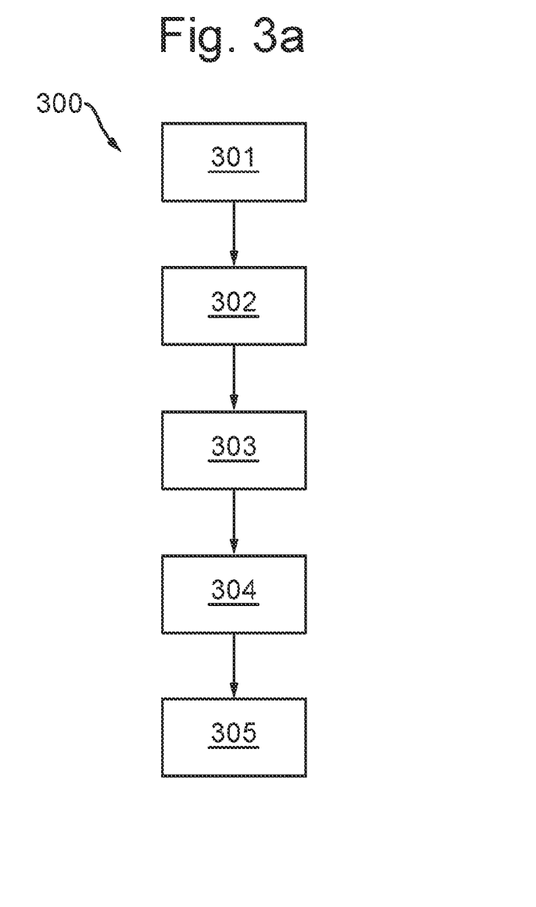
FIG. 3a is a flowchart illustrating the sequence of steps associated with a method of enabling the measurement of the surface roughness of a material according to an embodiment of the present invention.

Referring to FIG. 3a of the drawings, there is illustrated a method 300 of enabling the measurement of the surface roughness of a material 101 according to an embodiment of the present invention. The method 300 comprises illuminating the surface of the material at step 301, with a beam of radiation directed along a first axis and capturing at least a portion of the radiation reflected off the surface 101a at a detector 107, at step 302.

The method further comprises aligning a refractive optical element within the first axis at step 303, between the radiation source and the material, to cause the beam to become refracted along a second axis 106 at step 304, which is non-parallel with the first axis 104 and subsequently capturing the radiation reflected off the surface 101a at a detector 107 at step 305.

Figure 3B:
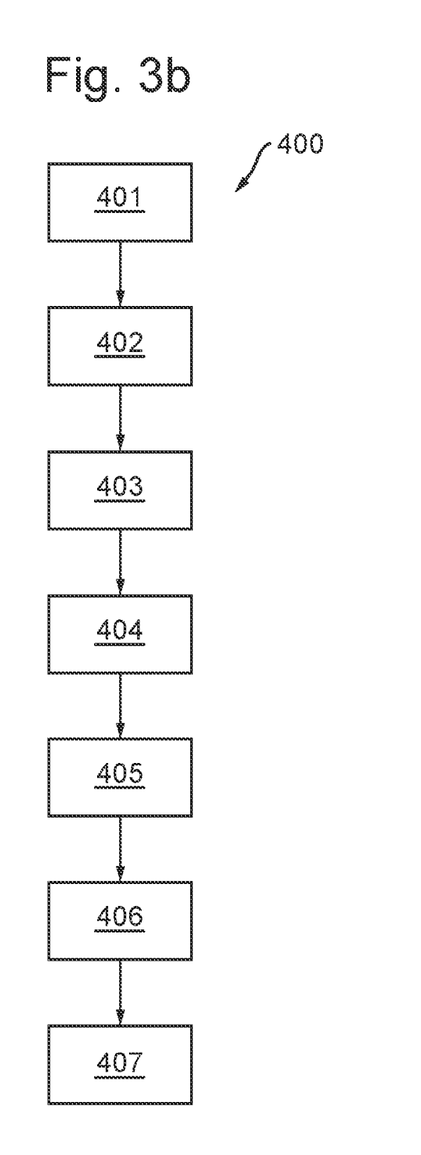
FIG. 3b is a flowchart illustrating the sequence of steps associated with a method of measuring the surface roughness of a material according to an embodiment of the present invention.

In a further embodiment of the present invention there is provided a method 400 of measuring the surface roughness of a material 201, the method 400 comprises the method 300 of enabling the measurement, as described above, and as such similar steps have been referenced with the same numerals but increased by 100. The method 400 of the further embodiment comprises the additional step of processing the detected radiation using a processor 208 at step 406 to generate a correlation value or coefficient, between the two sets of detected radiation, using a convolution algorithm.

The correlation coefficient C can be expressed in terms of the surface roughness parameter Rq, the wavenumber k ($=2\pi/\lambda$), the difference in incident angle $\delta\alpha$, namely the angular separation of the first and second axis 104, 106, and the absolute angle of incidence $\alpha$ (this being the angle of incidence to the material surface). Accordingly, once the correlation coefficient has been determined at step 406, a measurement of the surface roughness Rq can be determined using the processor 208 at step 407, using the following relationship:

$$C=\exp(-(R_q k\delta\alpha \sin \alpha)^2)$$

Figure 4:
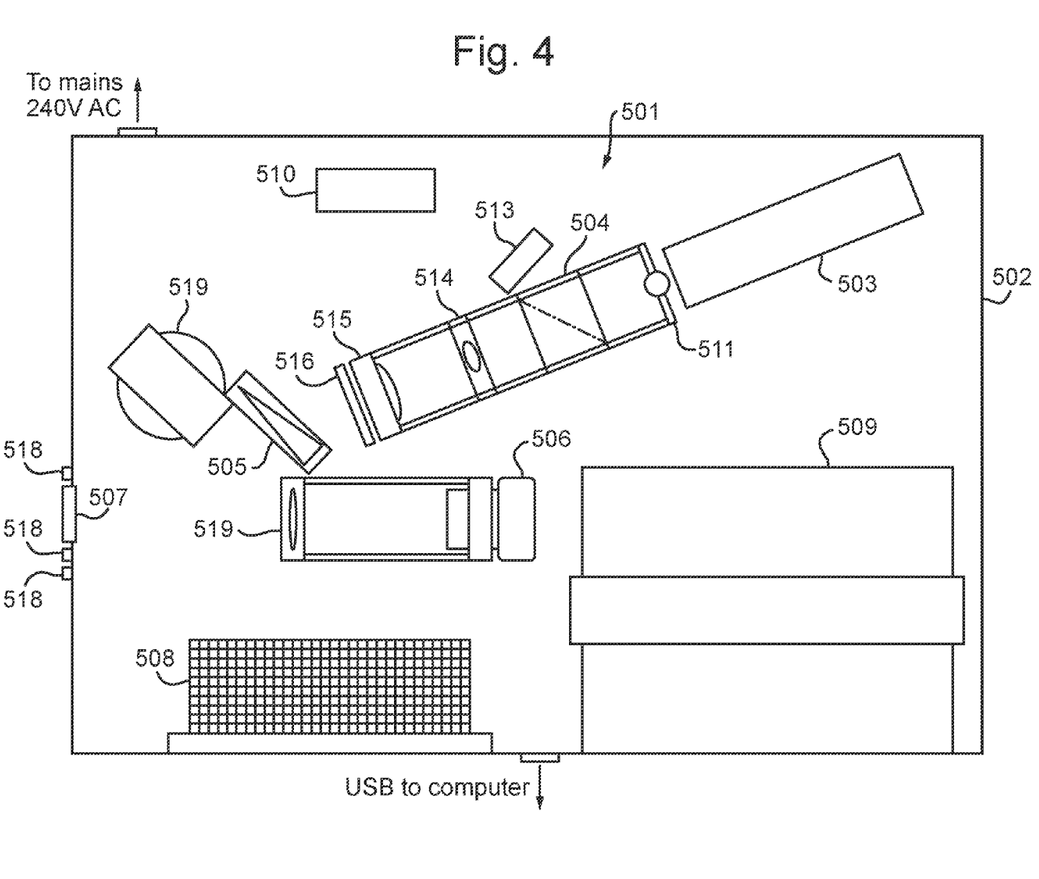
FIG. 4 is an overhead schematic plan view of portable apparatus for measuring surface roughness of a material.
Figure 5:
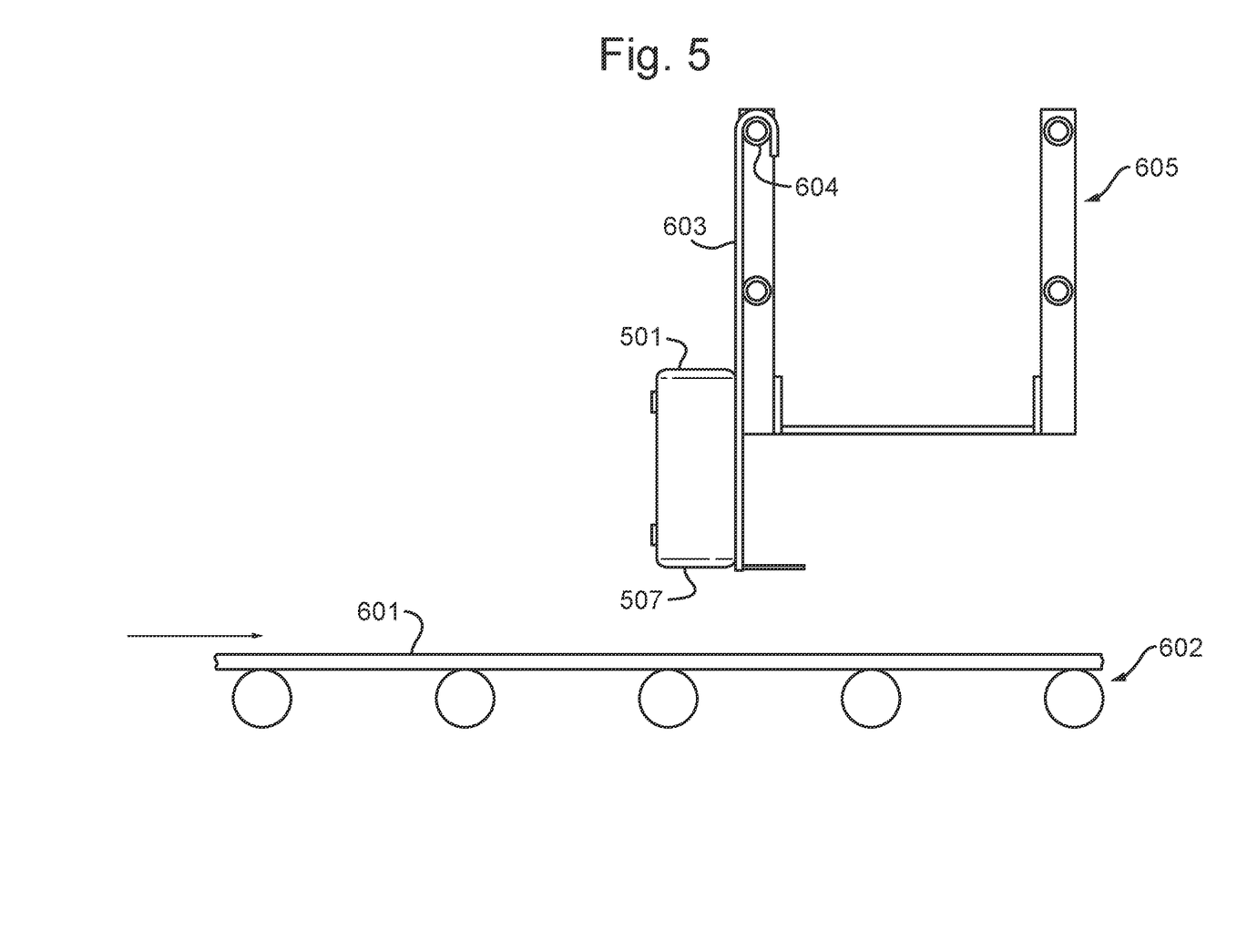
FIG. 5 is a schematic side view of the apparatus mounted in position above plate steel whose surface roughness is to be measured.

Referring to FIG. 4, portable apparatus suitable for measuring the surface roughness of a large variety of materials is shown and in FIG. 5 the apparatus is shown mounted above plate steel moving along a conveyor. Portable apparatus 501 is housed in a casing 502. Optical elements of the apparatus comprise a laser 503, beam attenuating and expanding means 504, a movable prism 505, a camera 506 and a shutter 507. Supporting the optical elements are a system power supply 508, a laser driver 509, a shutter control module 510 and a computer (not shown).

The laser is a CrystaLaser CL532-005-0 diode pumped solid state laser of wavelength 532 nm. The laser beam passes through an electro-mechanical shutter 511 to a polarising beam splitter 512, acting as a variable attenuator. The beam splitter 512 is a VBA05-532 PBS unit from Thorlabs. Unwanted laser radiation from the beam splitter 512 is caught by a laser beam dump 513. The laser beam next passes through a short focal length (f=1.45 mm) beam expanding lens 514 followed by a long focal length (f=25.4 mm) lens 515. An adjustable iris 516 is placed after the lens 515.

From the beam attenuating and expanding means 504 the laser beam may selectively pass through a movable wedge prism 516 before striking the target material 601 (see FIG. 5). The wedge prism used here is a fused silica wedge of 25 mm diameter with wedge angle of 1.38 degrees with a centre thickness of 6.67 mm from Crystan Ltd. The wedge prism 516 is rotatably mounted on a flipper 519 which is a MFF001 motorised mirror flipper from Thorlabs. A casing shutter 517 is biased closed and, in this particular embodiment, is arranged to open to allow passage of the laser beam when all of three microswitches 518 are activated by pressure against the target material 601. In this embodiment, this feature ensures that the laser beam strikes the material 601 at the desired angle of incidence and also, as a safety feature, blocks the laser beam unless the apparatus is pressed fully against the material whose roughness is being measured.

The laser beam reflected from the target material 601 passes back into the apparatus, through a long focal length (f=100 mm) imaging lens 519 to the camera 506. The camera 506 is a DCC1545M high resolution CMOS unit from Thorlabs and records the images reflected from the target material 601 with and without the prism 505 placed in the beam path. The images are then processed by the computer to give a measure of surface roughness for the target material 601 in the manner described above.

Referring now to FIG. 5, the apparatus 501 of the invention is shown suspended above a moving conveyor 602 supporting the target material 601 in the form of steel plate for use in constructing marine vessels. It will be appreciated that the target material here could equally comprise sheet steel for use in the automotive industry, for example, or in many other industries. Aluminium alloy for use in the aircraft industry, for example, could also have its surface roughness measured by the apparatus of the invention. For some applications, the ability of a material to adhere to coatings such as paint can be critically dependent on the surface roughness of the material.

The apparatus 501 is shown suspended from a carrier 603 which is hooked over a handrail 604 of a walkway 605, passing over the conveyor 602. The aperture 507 is positioned at the bottom of the unit, facing downwardly toward the steel plate. The plate steel target material 601 moves underneath the apparatus 501 on the conveyor 602 in the direction of the arrow. The apparatus 501 may either be operated remotely from the target material, as shown and with the conveyor continuing to move, or may be lowered into contact with the steel. If used remotely, the angle of incidence of the laser beam upon the surface must be sufficiently accurately controlled and the speed of the target material past the apparatus be taken into account when making measurements. Use of the apparatus on a fast moving production line, without holding up the line, is thus contemplated. If used when in contact with the steel, the conveyor may conveniently be stopped while taking measurements.

From the foregoing therefore it is evident that the above described arrangements and methods provide for an improved determination of the surface roughness of materials.

The invention claimed is:

1. An optical surface roughness measurement-enabling arrangement for enabling measurement of the surface roughness of a material, the arrangement comprising:
   an optical radiation source for generating a beam of collimated radiation and directing the beam along a first axis for illuminating the surface of the material;
   a refractive optical element rotatably mounted on the arrangement to move toward and away from the first axis and when optically aligned with the beam of radiation along the first axis, refracting the beam and directing the refracted beam along a second axis which is non-parallel with the first axis, for illuminating the surface of the material;
   a motor for moving the refractive optical element;
   a detector which is arranged to detect the radiation, incident upon the surface along the first axis and second axis, which becomes reflected off the surface of the material.

2. The measurement-enabling arrangement according to claim 1, wherein the refractive optical element comprises a front and rear substantially planar optical surface through which the beam of radiation along the first axis is arranged to pass when optically aligned with the beam of radiation along the first axis, the front and rear surface being orientated at an acute angle to each other.

3. The measurement-enabling arrangement according to claim 1, wherein the refractive optical element comprises an optical wedge.

4. The measurement-enabling arrangement according to claim 1, wherein the refractive optical element comprises a prism.

5. The measurement-enabling arrangement according to claim 1, wherein the optical radiation source comprises a source of laser radiation.

6. The measurement-enabling arrangement according to claim 1, wherein the first and second axes are orientated relative to each other at an angle less than 5°.

7. The measurement enabling arrangement according to claim 1, wherein the first and second axes are orientated relative to each other at an angle less than 2°.

8. The measurement-enabling arrangement according to claim 1, wherein the first and second axes are orientated relative to each other at an angle of substantially 1°.

9. An optical surface roughness measuring arrangement for measuring the surface roughness of a material, the optical surface roughness measuring arrangement comprising:
 the optical surface roughness measurement-enabling arrangement of claim 1; and
 a processor for processing the detected radiation to provide a measurement of the surface roughness.

10. A method of enabling a measurement of the surface roughness of a material, the method comprising:
 illuminating the surface of the material with a beam of radiation directed along a first axis;
 detecting the beam of radiation, incident upon the surface along the first axis which becomes reflected off the surface of the material;
 aligning the refractive optical element within the first axis between a radiation source and the material;
 refracting the beam of radiation directed along the first axis, using a refractive optical element, along a second axis which is non-parallel with the first axis, so that the surface of the material becomes illuminated with a beam of radiation directed along the second axis;
 detecting the radiation, incident upon the surface along the first axis and second axis, which becomes reflected off the surface of the material; and
 processing the detected radiation to provide a measurement of the surface roughness by determining the surface roughness Rq according to the relationship $C=\exp(-(R_q k \delta\alpha \sin \alpha)^2)$, where C is the correlation coefficient, k is the wavenumber of the beam of radiation, $\delta\alpha$ is the difference angle of the beams of radiation upon the surface along the first axis and the second axis, and $\alpha$ is the absolute angle of incidence to the surface of the material.

11. The method according to claim 10, wherein the processing of the detected radiation comprises correlating the radiation reflected from the surface from the first axis with the radiation reflected from the surface from the second axis.

12. The method according to claim 11, in which correlating the radiation reflected from the surface from the first axis with the radiation reflected from the surface from the second axis includes generating a correlation value or coefficient, between the two sets of detected radiation, using a convolution algorithm.

13. A method of measuring the surface roughness of sheet material, the method including:
 positioning the optical surface roughness measurement-enabling arrangement according to claim 9 adjacent a conveyor conveying the sheet material past the arrangement; and
 operating the optical surface roughness measuring arrangement whereby to measure the said surface roughness.

14. The method according to claim 10, wherein aligning the refractive optical element within the first axis between a radiation source and the material includes moving the refractive optical element using a motor.

* * * * *